United States Patent Office 2,916,362
Patented Dec. 8, 1959

2,916,362

PURIFICATION OF ZIRCONIUM TETRACHLORIDE

Robert Vincent Horrigan, Grand Island, and Owen Field Sprague, Akron, N.Y., assignors to National Lead Company, New York, N.Y., a corporation of New Jersey No Drawing. Application April 16, 1954
Serial No. 423,828

10 Claims. (Cl. 23—294)

The present invention relates to the purification of zirconium tetrachloride and is particularly concerned with a novel method by which zirconium tetrachloride of extremely high purity may be obtained.

Zirconium tetrachloride as usually produced is likely to be contaminated with finely divided carbon and with chlorides or other compounds of various metals and metalloids such as iron, silicon, magnesium, titanium, aluminum, calcium, copper, barium, sodium and potassium. A considerable amount of zirconium oxychloride is frequently also present.

Crude zirconium tetrachloride is used in the production of many zirconium chemicals by first reacting it with a limited amount of water to form a concentrated zirconium oxychloride solution. Removal of the free carbon from the oxychloride solution is quite difficult because of the tendency of the carbon particles, which are very fine, to plug any filtering medium employed. Consequently, some of the carbon and most of the metallic impurities are carried over into the final products.

Zirconium tetrachloride is also employed as one of the reactive materials in the production of zirconium metal. In a typical process for such production, zirconium tetrachloride is vaporized and the vapor is passed into a reactor where it is reduced to sponge zirconium by the action of a reducing metal such as magnesium. Although the carbon contamination in crude zirconium tetrachloride used for metal production does not constitute a serious problem since the bulk of the carbon is left behind during the sublimation of the tetrachloride, the metal and metalloid impurities which contaminate the crude zirconium tetrachloride, in amounts which may be as high as 3500 parts per million, are to a large extent carried over into the reactor where they also are reduced. If low hardness metallic zirconium is to be produced, the exclusion of oxygen from the zone of the reduction reaction is of extreme importance. Since a substantial proportion of the oxygen-containing compounds of zirconium present is carried over, presumably by physical entrainment with the vapor during sublimation of zirconium tetrachloride from the solid state, obtaining a zirconium metal product with low oxygen content is frequently difficult.

To avoid the deleterious effects on the zirconium metal product resulting from the presence of the above-mentioned impurities in the reactor, attempts have been made to purify crude zirconium tetrachloride before its introduction into the reactor by subliming it in the presence of a reducing agent, such as gaseous hydrogen. By such sublimation a substantial amount of the iron chloride present is reduced to ferrous chloride, which is non-volatile at the temperatures employed and is thus not carried over with the $ZrCl_4$, but the other impurities are not materially reduced in amount. Sublimation in hydrogen is, moreover, a rather hazardous operation and to be avoided if possible.

It is, therefore, an object of the present invention to provide a novel, efficient and inexpensive method for the purification of zirconium tetrachloride.

Another object of the invention is to provide a method for the purification of zirconium tetrachloride which results in a product substantially free from volatile and entrained impurities.

A further object of the present invention is to provide a method for the purification of zirconium tetrachloride which is applicable to either a cyclic or continuous operation.

Another object of the invention is to provide a process of the character described in which relatively low temperatures and inexpensive apparatus and materials may be used.

Other objects and advantages of the present invention will be apparent from the following description.

Zirconium tetrachloride sublimes at about 331° C. under a pressure of 760 mm. of mercury. It is known to be soluble in molten alkali metal chlorides and fused mixtures comprising major amounts of zirconium tetrachloride may be formed with such chlorides. It has now been found that by heating such mixtures at temperatures above their melting points substantial percentages of the zirconium tetrachloride therein may be driven off or vaporized and condensed in a remarkably pure state. As will be seen hereinafter, the amount of deleterious metallic impurities in the purified product may be less than 6 percent of the amount in the crude zirconium tetrachloride, most of the impurities, other than hafnium, remaining in the unvaporized salt residue. The purified salt also has a low oxygen content.

It is pertinent here to point out that there is a greater resemblance between the chemical and physical properties of hafnium and zirconium and their respective compounds than between those of any other pair of elements known. This fact makes the separation of the two elements extraordinarily difficult and, as a result, since hafnium is always found with zirconium in nature, hafnium-free zirconium metal and compounds are used for only a very few purposes. Consequently, the hafnium tetrachloride content in zirconium tetrachloride is not normally, or for the purpose of this invention, considered a deleterious impurity.

Although many different mixtures of crude zirconium tetrachloride and one or more alkali metal chlorides may be employed in carrying out the novel process of the present invention, it has been found that a fused starting mixture, containing 88 percent (70.0 mol percent) crude zirconium tetrachloride and 12 percent (30.0 mol percent) potassium chloride, is most convenient to prepare and is very efficient in use. In preparing such a fused mixture the pulverized salts are intimately admixed and heated in a suitable vessel. Melting of the mass begins at about 225° C. and is quite rapid at about 250° C.–260° C. The fused salt mixture solidifies at approximately 215° C. It appears that the composition of this mixture corresponds to that of the eutectic mixture having the minimum melting temperature in the $ZrCl_4$—$KCl$ system. Examples of the purification of zirconium tetrachloride using this fused mixture are given below.

*Example 1*

A weighed quantity of the solid mixed salt fusion product described above was placed in a suitable apparatus of heat-resistant borosilicate glass and heated. At a temperature of about 400° C. appreciable evolution of $ZrCl_4$ was observed. The temperature was increased to 500° C. and the evolved $ZrCl_4$ was condensed in a cooled portion of the apparatus. Heating was discontinued after an hour and the apparatus and its contents were permitted to cool. It was found that 64 parts by weight of purified $ZrCl_4$, as a crystalline solid, were obtained per 100 parts of charged salt mixture.

The crude $ZrCl_4$ used as a charge contained about 3000 parts of metallic impurities per million parts of zirconium. In the condensed purified product carbon was substantially absent and the metallic impurities amounted to only about 193 parts per million parts of zirconium. It should be understood that these figures are on a metal to metal basis and that the term "metallic impurities" includes metalloid impurities but does not include hafnium. For the reasons stated above, hafnium is not regarded as an impurity for the purposes of the present invention and will, therefore, be ignored in further discussion and comparisons. Since the amount of metallic impurities in $ZrCl_4$ which has been sublimed in a hydrogen atmosphere is usually about half the amount of impurities in the crude chloride, it will be obvious that the process of the present invention is very effective.

*Example 2*

In a repetition of the procedure set forth in Example 1 and when using a charge of the same composition a recovery of 60.5 parts by weight of purified $ZrCl_4$ per 100 parts of charge was obtained. The product contained only about 138 parts of metallic impurities per million parts of zirconium and no detectable carbon.

*Example 3*

Substantially similar results were obtained by heating a prefused mixture of impure $ZrCl_4$ and KCl like that used in Example 1 at a temperature of 600° C. After heating for an hour the condensed purified zirconium tetrachloride recovered was found to constitute 62.5 parts per 100 parts of fused salt charge used and the metallic impurities in the product were found to be only about 174 parts per million parts of zirconium.

*Example 4*

Heating a starting mix consisting of a prefused mixture of 88 percent crude $ZrCl_4$ and 12 percent KCl at somewhat lower temperatures was also found effective in obtaining vaporization of a very pure zirconium tetrachloride. A somewhat greater time of heating, however, was required for a good yield. Thus, at a temperature of about 450° C. approximately 2½ hours of heating were required to obtain a yield of purified zirconium tetrachloride approaching that obtained by heating at 500° C. for 1 hour.

The yield of the process as carried out in Examples 1–4 is satisfactorily high. In a number of runs the yield of purified zirconium tetrachloride averaged approximately 61 parts per 100 parts of 88 crude $ZrCl_4$—12 KCl fused salt charged. The residue averaged, therefore, about 77% $ZrCl_4$ or 41.6 mol percent. The maximum yield of purified $ZrCl_4$ which might be expected in the process is believed to be about 76 parts per 100 parts of prefused salt, because the residue would then contain about 12 parts of $ZrCl_4$ and the original 12 parts of KCl, corresponding to about 24 mol percent of $ZrCl_4$. It is known that this composition melts at 560° C. and may be heated to much higher temperatures without substantial evolution of $ZrCl_4$. The recovery for the process, therefore, can be represented by the ratio of the averaged actual yields to the maximum possible yield, i.e. 61:76, or about 80 percent. While somewhat greater recoveries may be obtained by prolonging the heating time or by using higher temperatures, these practices are in general not preferred.

It will be obvious that mixtures of $ZrCl_4$ and KCl containing between 50 percent and 88 percent $ZrCl_4$ (24.2–70.0 mol percent) may also be used as starting mixes in carrying out the present process. However, the yields obtained from such mixtures will be, for the reason explained above, less than those obtained with a $ZrCl_4$:KCl ratio of 88 to 12. Moreover, since the 88:12 mixture has the lowest melting point of the system, production of fused mixtures having less $ZrCl_4$ will be more difficult and expensive since the higher temperatures required for melting such mixtures approach and exceed the sublimation temperature of $ZrCl_4$. Although they also are usable, fused mixtures containing more than 88 percent of $ZrCl_4$ are not preferred because of the greater loss of $ZrCl_4$ by sublimation in forming them. Since, as pointed out above, the residue from prolonged heating of melts of zirconium tetrachloride and alkali-metal chlorides still contains in the neighborhood of 40 mol percent of $ZrCl_4$, it is clear that substantial yields of purified $ZrCl_4$ are readily obtainable only when the original fused salt mixture contains more than about 40 mol percent of $ZrCl_4$.

Results similar to those obtained in the foregoing examples may also be obtained by heating mixtures of zirconium tetrachloride with other alkali metal chlorides and with a plurality of such chlorides as shown in the following examples.

*Example 5*

An intimate mixture of 12.5 parts pulverized NaCl, 12.5 parts pulverized KCl and 75 parts by weight pulverized crude $ZrCl_4$ was made. The mol percentages are, respectively, 36.6, 17.8, and 45.6. The mixture was then heated in a suitable container at about 260° C. until it became fluid. When cooled, the fused mixture became solid at 240° C. A portion of the solid mass was placed in a borosilicate glass apparatus and heated for an hour at about 500° C. A quantity of condensed purified $ZrCl_4$ was recovered from a cooled portion of the apparatus. The weight of the purified product was 39 percent of the weight of the charge or 52 percent of the amount of $ZrCl_4$ in the charge. The recovered $ZrCl_4$ contained only about 476 parts per million of metallic impurities and substantially no free carbon.

It will be noted that the yield of purified zirconium tetrachloride in Example 5 was much lower than the yields obtained when using the mixture of salts employed in Examples 1 to 4. The composition of the mixture used in Example 5 is that which was found to have the lowest freezing point of the mixtures of $ZrCl_4$, KCl and NaCl that contain 50 percent or more (above 22 mol percent) $ZrCl_4$ and have approximately equal percentages of KCl and NaCl. In this connection, it is well known that in the KCl—NaCl system the lowest melting composition is quite close to 50 percent of each salt. Because of the relatively high melting points of salt mixtures similar to the one used in Example 5 but containing more zirconium tetrachloride (a mixture of 88 percent (67.1 mol percent) $ZrCl_4$, 6 percent KCl and 6 percent NaCl has a melting point of 275° C.), it would not generally be feasible to increase the yield of purified zirconium tetrachloride by using such mixtures.

*Example 6*

In another run using a fused starting mix of the same composition as that in Example 5 a purified $ZrCl_4$ product containing only about 241 parts per million of metallic impurities was obtained.

*Example 7*

An intimate mixture of 12 parts pulverized NaCl and 88 parts pulverized crude $ZrCl_4$ (64.6 mol percent) was prepared. The mixture was then heated at about 300° C. until it became fluid. After cooling, a portion of the fused salt mixture was heated in an apparatus formed of a heat-resistant borosilicate glass to a temperature between 550° C. and 600° C. A substantial yield of $ZrCl_4$ sublimate was obtained in a cooled portion of the apparatus. The sublimate contained less than 200 parts per million of metallic impurities. Since the crude $ZrCl_4$ contained about 1900 parts per million of metallic impurities it is evident that a great improvement was made in the purity.

As is shown in the following example, substantial amounts of alkaline-earth metal chlorides may be added to mixtures of zirconium tetrachloride and alkali metal chlorides without interference with the purification of the zirconium salt.

Example 8

Pulverized crude $ZrCl_4$, KCl and $BaCl_2$ were mixed together in substantially the proportions 82:12:6 corresponding, respectively, to the following mol percentages 64.8, 29.8 and 5.4. The mixture was fused by heating at about 270° C. to 275° C. The resulting fusion product was placed in a heat-resistant glass apparatus and heated to a temperature between 550° C. and 600° C. A crystalline deposit of sublimed $ZrCl_4$ was obtained in a cooled portion of the apparatus. This deposit contained less than 200 parts per million of metallic impurities in contrast to the approximately 1900 parts per million in the crude $ZrCl_4$ used.

The processes illustrated in Examples 7 and 8 were very effective in purifying zirconium tetrachloride as shown by the fact that the iron content in both cases was reduced from about 1000 parts per million to about 1 part per million and free carbon was substantially absent. Since, however, preparation of fused salt starting mixtures such as used in these examples requires heating to temperatures higher than the $ZrCl_4$—KCl mixture used in Example 1 and nearer 331° C., the sublimation point of $ZrCl_4$, their use is not preferred. In this connection, it must be realized that even at temperatures well below 331° C. $ZrCl_4$ has a considerable vapor pressure. Consequently, other things being equal, it is preferred in carrying out the present process to use starting mixes which fuse at temperatures as far below 331° C. as possible.

The overall efficiency of the present process may be greatly increased by re-use of the salt mixtures remaining after recovery of purified zirconium tetrachloride by the procedure set forth in the preceding examples. These residues may be fused with additional impure $ZrCl_4$ to reform salt mixtures like those employed as starting mixes in the examples. An illustration of such re-use is given in the following example.

Example 9

The fused salt residue remaining after carrying out the work described in Example 2 was allowed to cool, removed from the heating apparatus, and pulverized. The salt contained 27.5 parts of $ZrCl_4$ and 12 parts of KCl (42.4 and 57.6 mol percent, respectively). 60.5 parts of crude $ZrCl_4$ were added to and thoroughly mixed with the pulverized recovered salt and the mixture was replaced in the retort. Melting and heating to cause evolution of purified $ZrCl_4$ vapor were carried out as described in Example 1 and a yield of 61.5 percent purified $ZrCl_4$ was obtained as a sublimate after heating for 1 hour. The residual fused salt mixture was again allowed to cool, was re-pulverized and the $ZrCl_4$ content was again raised by mixing therewith 61.5 parts of crude $ZrCl_4$. The resultant mixture was in turn placed in the heating apparatus and the temperature was again raised to 500° C. to vaporize $ZrCl_4$. Upon heating for 1 hour a yield of condensed $ZrCl_4$ amounting to 61 percent of the weight of the charge was obtained. Upon investigation it was found that the purity of the $ZrCl_4$ recovered was quite high. The product obtained during the first recycle contained about 129 parts per million of metallic impurities while the metallic impurities in the product from the second recycle amounted to only about 169 parts per million. As pointed out above, such impurity contents are very satisfactory as they are much lower than those obtained by any other practical method.

The recycling method described in Example 9 may be continued for many cycles before the accumulation of metallic impurities in the residual salt mixture becomes so great as to make further operation inadvisable. Thus the loss of zirconium tetrachloride in the discarded mixture is kept to a minimum. It will be obvious from the prior discussion and examples that the process of Example 9 is quite flexible in that the heating time in any cycle is not critical and that the amount of $ZrCl_4$ added for regeneration in any cycle need not be extremely accurately determined. As previously pointed out, the ratio 88:12 for $ZrCl_4$ and KCl is convenient because of its low melting point and is efficient because of high recoveries of purified $ZrCl_4$ possible. If, however, in any cycle the salt composition is not restored by the addition of crude $ZrCl_4$ to exactly this ratio the process is still entirely operative and only the yield is affected. Consequently, the process may be easily carried out and precise control by frequently repeated analyses is not required.

It will be obvious that the process described in Example 9 may be modified in a number of ways. Thus, for example, other suitable mixtures of crude zirconium tetrachloride and one or more alkali metal chlorides together with, if desired, one or more alkaline-earth metal chlorides may be used. Also, the regeneration of the residual salt mixture by addition of crude zirconium tetrachloride may be carried out in various ways. As an illustration, the retort containing the fused salt mixture left after driving off a quantity of purified $ZrCl_4$ may be disconnected from the other portions of the apparatus and removed. Then, while the mixture therein is still liquid, sufficient pulverized crude $ZrCl_4$ may be added, with stirring if desired, to restore the composition of the mixture to that wanted. Thereupon, the retort may be replaced and again heated to drive off more purified $ZrCl_4$. If desired, instead of solid zirconium tetrachloride, crude $ZrCl_4$ vapor may be used for the regeneration of residual fused salt mixtures.

It will also be understood that fused salt compositions of the types herein described, for example the low melting 88 $ZrCl_4$—12 KCl mixture, may be employed to scrub impurities from impure zirconium tetrachloride. Thus, crude $ZrCl_4$ may be continuously introduced into a molten salt mixture of the approximate composition mentioned above at approximately the same rate at which purified $ZrCl_4$ is vaporized from the molten salt bath. The composition and thus the molten state of the salt bath will in such case be maintained until the concentration of impurities retained in the molten salt mixture increases to a point where further operation is inadvisable.

It will be apparent from the foregoing description and discussion that the present invention provides a method for producing zirconium tetrachloride which has a remarkably low content of metallic impurities and substantially no free carbon. As pointed out above, the oxygen content of zirconium tetrachloride is also very important when the chloride is to be used for metal production. Production of low hardness zirconium metal (about 150 or lower Brinell) by the well known Kroll process requires the use of zirconium tetrachloride containing no more than about 200 parts of oxygen per million parts of $ZrCl_4$. Since tests of purified $ZrCl_4$ resulting from the process of the present invention indicate that the product has an oxygen content of not more than 30 parts per million, it is evident that the product of the present novel process is admirably suited for zirconium metal production as well as for the manufacture of other zirconium compounds of high purity. It is also evident that the process is economically attractive. The materials used, other than crude $ZrCl_4$, are chlorides which are comparatively inexpensive and the low temperatures involved permit the use of apparatus formed of borosilicate glass or other chloride-resistant materials of construction such as certain alloys of nickel, molybdenum, iron, etc. which are well known to those skilled in the art.

It will be further apparent that the alkali metal chloride or chlorides employed in forming fused salt starting mixes need not be chemically pure since metallic impurities therein will be retained in the salt bath in the same manner as the impurities in the ZrCl$_4$. Moreover, as pointed out above, substantial amounts of alkaline-earth metal chlorides may be used with the alkali metal chloride or chlorides. It is also to be noted that the novel process of the present invention does not require the use of controlled atmospheres or a vacuum and therefore the expense of providing and maintaining the apparatus necessary for maintaining a special atmosphere is avoided. However, it will be understood that, if desired, the purification apparatus may be evacuated or may be filled with an inert gas.

As previously pointed out herein, the chemical behavior of zirconium and that of hafnium are substantially the same. Accordingly the purification process of the present invention is also adapted not only for the removal of impurities from zirconium tetrachloride and mixtures of zirconium and hafnium tetrachloride but also from hafnium tetrachloride.

In this specification and the appended claims, percentages and parts are, unless otherwise specified, percentages and parts by weight.

We claim:

1. A process for purifying tetrachlorides of zirconium and hafnium which comprises forming, from a mixture of impure tetrachloride of at least one of said metals and at least one chloride of the group consisting of alkali metal chlorides and alkaline-earth metal chlorides, a completely fused, substantially homogeneous melt containing above about 40 mol percent but not above about 70 mol percent of said tetrachloride and at least about 20 mol percent of an alkali metal chloride; thereafter distilling purified tetrachloride from said melt by heating said melt to a temperature between about 450° C. and about 600° C. while the tetrachloride content of said melt remains above about 40 mol percent; and condensing the evolved purified tetrachloride.

2. A process as set forth in claim 1 in which an alkaline-earth metal chloride is present in said melt in minor amount.

3. A process as set forth in claim 1 in which said melt contains a substantial amount of potassium chloride.

4. A process as set forth in claim 3 in which said melt contains initially about 70 mol percent of said tetrachloride.

5. A process for purifying zirconium tetrachloride which comprises forming, from a mixture of impure zirconium tetrachloride and at least one alkali metal chloride, a completely fused, substantially homogeneous melt containing, aside from impurities, above about 40 mol percent but not above about 70 mol percent of said tetrachloride, balance alkali metal chloride; thereafter distilling purified zirconium tetrachloride from said melt by heating said melt to a temperature between about 450° C. and about 600° C. while the zirconium tetrachloride content thereof remains above about 40 mol percent; and condensing the evolved purified zirconium tetrachloride.

6. A process as set forth in claim 5 in which said melt contains initially about 70 mol percent of zirconium tetrachloride.

7. A process as set forth in claim 5 in which said melt contains a substantial amount of potassium chloride.

8. A process as set forth in claim 7 in which said melt initially contains about 70 mol percent of zirconium tetrachloride.

9. A process as set forth in claim 6 in which after distillation of at least some purified zirconium tetrachloride from said melt additional zirconium tetrachloride is dissolved in said melt and the melt is thereafter reheated to a temperature between about 450° C. and about 600° C. at which additional purified zirconium tetrachloride is distilled therefrom.

10. A process as set forth in claim 6 in which impure zirconium tetrachloride is added to and dissolved in said melt at substantially the same rate at which purified zirconium tetrachloride is distilled therefrom.

References Cited in the file of this patent

UNITED STATES PATENTS 2,443,253    Kroll et al.            June 15, 1948

OTHER REFERENCES

Kroll et al.: "High Temperature . . . Zirconium Compounds," Bureau of Mines, R.I. 4915, November 1952, pp. 6, 20 and 21.